(12) United States Patent
Broddle et al.

(10) Patent No.: US 11,792,257 B2
(45) Date of Patent: Oct. 17, 2023

(54) FORM ENGINE

(71) Applicant: Advantage Integrated Solutions, Inc., Denver, CO (US)

(72) Inventors: Henry Michael Broddle, Denver, CO (US); Scott Joseph Wyatt, Denver, CO (US)

( * ) Notice: Subject to any disclaimer, the term of this patent is extended or adjusted under 35 U.S.C. 154(b) by 0 days.

(21) Appl. No.: 17/138,262

(22) Filed: Dec. 30, 2020

(65) Prior Publication Data

US 2021/0203713 A1   Jul. 1, 2021

Related U.S. Application Data

(60) Provisional application No. 62/955,612, filed on Dec. 31, 2019.

(51) Int. Cl.
*G06F 17/00* (2019.01)
*H04L 67/06* (2022.01)
*G06F 3/04842* (2022.01)
*H04L 67/10* (2022.01)
*G06F 40/186* (2020.01)

(52) U.S. Cl.
CPC .......... *H04L 67/06* (2013.01); *G06F 3/04842* (2013.01); *G06F 40/186* (2020.01); *H04L 67/10* (2013.01)

(58) Field of Classification Search
CPC .. G06F 3/04842; G06F 40/186; G06F 40/174; H04L 67/06; H04L 67/10; H04L 67/1097
USPC ......................................................... 715/221
See application file for complete search history.

(56) References Cited

U.S. PATENT DOCUMENTS

| | | | | |
|---|---|---|---|---|
| 9,286,335 | B1* | 3/2016 | Benton, Jr. ............ | G06Q 30/00 |
| 10,552,525 | B1* | 2/2020 | Allison ................. | G06Q 10/10 |
| 11,494,051 | B1* | 11/2022 | Davis ................... | G06V 30/418 |
| 2006/0075391 | A1* | 4/2006 | Esmonde ............... | G06Q 10/10 |
| | | | | 717/136 |
| 2006/0271352 | A1* | 11/2006 | Nikitin ................... | G06F 40/58 |
| | | | | 704/9 |
| 2007/0250769 | A1* | 10/2007 | Bass ..................... | G06F 40/174 |
| | | | | 715/234 |

(Continued)

FOREIGN PATENT DOCUMENTS

EP          3370141 A1 *   9/2018    ........... G06F 3/0482

*Primary Examiner* — Stephen S Hong
*Assistant Examiner* — Matthew J Ludwig
(74) *Attorney, Agent, or Firm* — FisherBroyles, LLP; Gregory T. Fettig

(57) ABSTRACT

Systems and methods herein provide for a form engine communicatively coupled to a storage system to retrieve a plurality of graphical control elements from a first of the source systems. The form engine generates a template that controls placement of the graphical control elements into the electronic document based on user-selectable cartesian coordinates, and persists the template in the storage system according to the compartmentalized portion of the first source system. The form engine may then authenticate a first user of the first source system, import an electronic file at the direction of the user, retrieve the template from the storage system, and format placement of the graphical control elements in the electronic file according to the cartesian coordinates of the template and a scale of the electronic file to generate an electronic form for the first source system.

20 Claims, 13 Drawing Sheets

(56) References Cited

U.S. PATENT DOCUMENTS

| | | | |
|---|---|---|---|
| 2008/0046292 A1* | 2/2008 | Myers | G06F 16/283 |
| | | | 705/3 |
| 2008/0255838 A1* | 10/2008 | Callaghan | G06F 40/174 |
| | | | 704/235 |
| 2009/0097769 A1* | 4/2009 | Velasquez | G06F 21/62 |
| | | | 382/249 |
| 2009/0254803 A1* | 10/2009 | Bayne | G06F 40/174 |
| | | | 715/733 |
| 2010/0241948 A1* | 9/2010 | Andeen | G06F 40/143 |
| | | | 715/234 |
| 2011/0302483 A1* | 12/2011 | Greenberg | G06F 40/174 |
| | | | 715/222 |
| 2012/0226969 A1* | 9/2012 | Begole | G06F 40/174 |
| | | | 715/226 |
| 2013/0097480 A1* | 4/2013 | Allison | G06Q 10/10 |
| | | | 715/223 |
| 2013/0174014 A1* | 7/2013 | Kwan | G06F 40/103 |
| | | | 715/234 |
| 2013/0205188 A1* | 8/2013 | Lunde | H04L 67/02 |
| | | | 715/224 |
| 2014/0380141 A1* | 12/2014 | Craven | G06F 40/114 |
| | | | 715/222 |
| 2017/0046317 A1* | 2/2017 | Geva | G06F 40/103 |
| 2017/0337211 A1* | 11/2017 | Netsch | G16H 10/20 |
| 2017/0357628 A1* | 12/2017 | Hurley | G06F 40/186 |
| 2018/0048532 A1* | 2/2018 | Poort | H04L 47/70 |
| 2018/0330801 A1* | 11/2018 | Malaviya | G06F 40/174 |
| 2020/0065362 A1* | 2/2020 | Swamy | G06F 40/174 |
| 2020/0074169 A1* | 3/2020 | Mukhopadhyay | G06F 18/22 |
| 2020/0097714 A1* | 3/2020 | Moghtadai | G06Q 30/0206 |
| 2020/0110796 A1* | 4/2020 | Tsabba | G06F 8/38 |
| 2020/0210513 A1* | 7/2020 | Evans | G06F 16/1873 |

* cited by examiner

FORM ENGINE

CROSS REFERENCE TO RELATED APPLICATIONS

This patent application claims priority to, and thus the benefit of an earlier filing date from, U.S. Provisional Patent Application No. 62/955,612 (filed Dec. 31, 2019), the contents of which are hereby incorporated by reference.

BACKGROUND

A relatively large disconnect in business processes exists between: 1. the generation/execution of multitudes of legal, business, and government forms and documents in prescribed formats that are required for organizations to operate; and 2. an organizations' source systems, where artifacts, and particularly the data in them, need to be added and used in the source systems and other forms and documents for an organization to do its work. Modern source system interfaces use relatively simple web forms for users to manually enter data and attach business artifacts. These simple system interfaces are inadequate and are generally incompatible with the highly formatted business forms with unstructured data and requisite e-signatures. And, third-party tools like Docusign enable a level of form digitizing, but are not designed to interact with source systems to generate working source system forms and data-populated documents. Rather, they are designed to execute agreements on a stand-alone basis.

Generally, third-party tools can provide "middleware" for business form and agreement execution, and store artifacts and their data outside of the source system. This disconnect is a shortcoming in the functioning of the network. The gap between e-signature tools/e-form-builder tools and a company's source systems results in significant costs in labor, time, errors and risk to organizations because manual integration is needed to obtain volumes of business assets and their data into and out of source systems.

For example, some 150 plus million U.S. employees fill out and submit W-4 forms to their employer at hiring and at various intervals thereafter. Official W-4 forms are highly formatted portable document formats (PDFs) from the government. Most companies have employees fill out a PDF W-4 form, print it, and physically sign it. Then, the employees scan the signed form into an image and return it to the employer by email. Some companies may use Docusign or other e-signature tool for an incremental improvement where the employee can complete and e-sign them on screen. However, neither method processes a W-4's data and executed PDFs into the employer's source system, where it is needed to keep source data current, for additional processes, compliance, and record-keeping.

Executing forms like W-4s and getting them correctly into a source system should be a native source system function, but even today's modern source systems (e.g., Salesforce, ServiceNow, Workday, Quick Base, QuickBooks, etc.) cannot do that. And, while Blockchains may provide stand-alone solutions to execute smart contracts, the data that goes into those contracts need to be placed into signed, formatted PDF artifacts for visual reference, recordkeeping, and legal evidence of contract execution. What is needed is the ability to convert formatted offline forms into system forms that allow e-signatures and two-way data and artifact flow directly between a user's screen and the organization's source systems, which does not exist today.

SUMMARY

The embodiments herein provide for systems and methods that extend and improve source systems/databases to be able to convert offline, formatted business assets into online source system forms and data-populated documents without coding. The embodiments herein provide for the generation, processing, and storage of formatted business assets in a source system without the need to execute or store them in a middleware software application/repository. In one embodiment, a system includes a cloud-based storage system compartmentalized according to a plurality of source systems and operable to store data of the source systems. The system also includes a form engine communicatively coupled to the storage system and operable to retrieve a plurality of graphical control elements from a first of the source systems. The graphical control elements are operable to provide interactive functionality to an electronic document. The form engine is further operable to generate a template that controls placement of the graphical control elements into the electronic document based on user-selectable cartesian coordinates, and to persist the template in the storage system according to the compartmentalized portion of the first source system. The form engine is further operable to authenticate a first user of the first source system, to import an electronic file at the direction of the user, to retrieve the template from the storage system, and to format placement of the graphical control elements in the electronic file (e.g., without code or field tags) according to the cartesian coordinates of the template and a scale of the electronic file to generate an electronic form for the first source system.

This embodiment and others herein extend a source system's ability to convert offline forms, such as a W-4, into a working source system form with their requisite legal formats. The embodiments also provide for a real-time, two-way data exchange between the forms and source systems in a stateless solution with no intermediary storage of the data or documents between a user's screen and the source system. In these embodiments, legal forms may be converted into online source system forms that are persistently connected to source system schema and may be pre-populated with source system data. End-users may then render and complete forms with source system data validation and execute them with e-signatures when needed for submission. The mapped data in each form may be converted into structured data records in the source system that are used to create and/or update source system records. A copy of the executed form (e.g., a PDF) may also be generated and attached in the source system as a legal artifact. This means that a source system may become a single form creation, execution, document storage, and management system that eliminates the need for such functions to be performed externally.

Form engine users of the embodiments herein can convert offline forms like the W-4 and other business assets into working online system assets in minutes with no coding needed. Screen backgrounds can also be used as backgrounds for custom system forms. The embodiments herein may also be configured with multiple source systems from a single code base and architected so that other application programming interface (API) enabled source systems can be easily added with only source system user authentication required for all functions. Thus, these embodiments may automate offline processes and improve the speed and efficiency of businesses and governments.

In some embodiments, the form engine allows a user to generate enterprise level forms for use throughout the enterprise. Generally, the form engine is operable as a cloud business computing system, and an extension of the source systems it is configured to work with. The form engine embodiments herein automate data, files, and/or documents to be entered into and retrieved from structured data in the database source systems, by enabling users to digitize and integrate offline legal, business, government, and/or custom forms into them. Examples of applicable database source systems include systems like Salesforce, ServiceNow, Quick Base, Oracle, and various Blockchains. The embodiments herein also allow users to execute agreements and transactions of a plurality of types in their various source systems. The form engine may also generate formatted document outputs from source system data and enable creation of custom source system forms from substantially any background image.

In one embodiment, the form engine enables users to "no-code" conversion (i.e., digitization) of offline business forms, agreements, documents, transactions, images, and/or other assets into working, persistent, online system assets available in almost any API-enabled database. The form engine may provide such by navigating a "form builder" user through the source system's schema in real-time and displaying schema elements (e.g., graphical control elements) such that the user can work directly with them as objects without the need to separate information about the source system schemas, field tags, multiple programs/modules, and/or separate mapping components.

The various embodiments disclosed herein may be implemented in a variety of ways as a matter of design choice. For example, some embodiments herein are implemented in hardware, whereas other embodiments may include processes that are operable to implement and/or operate the hardware. Other exemplary embodiments, including hardware, software, firmware, and various combinations thereof are described below.

BRIEF DESCRIPTION OF THE FIGURES

Some embodiments are now described, by way of example only, and with reference to the accompanying drawings. The same reference number represents the same element or the same type of element on all drawings.

FIGS. 8A-8E illustrate screenshots of exemplary GUIs of the form engine.

DETAILED DESCRIPTION OF THE FIGURES

The figures and the following description illustrate various exemplary embodiments. It will thus be appreciated that those skilled in the art will be able to devise various arrangements that, although not explicitly described or shown herein, embody various principles of design and/or operation and are included within the scope of the embodiments. Furthermore, any examples described herein are intended to aid in understanding the principles of the embodiments and are to be construed as being without limitation to such specifically recited examples and conditions.

Figure 1:
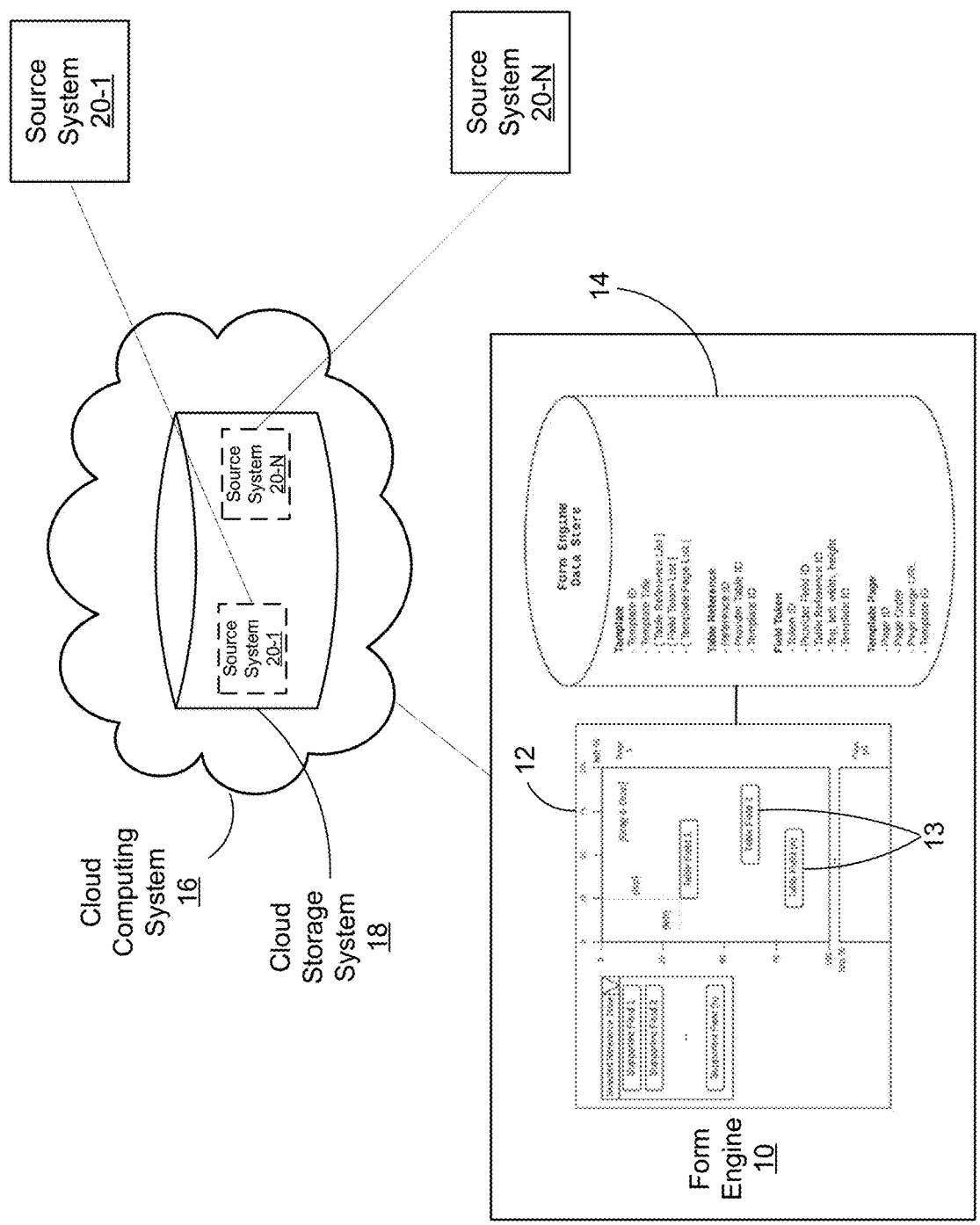
FIG. 1 is a block diagram of an exemplary form engine.

FIG. 1 is a block diagram of an exemplary form engine 10. The form engine 10 is operable to generate electronic forms from various images and documents (collectively electronic files) by inserting graphical control elements 13 into the electronic files. The generated forms may then be stored for enterprise-wide use by a source system 20 to implement its various policies and data retention. For example, an organization may employ a number of employees. The organization may wish for the employees to execute forms, such as a US government W4, from their source system 20. The form engine 10 may process an electronic version of the form to insert graphical control elements 13 into the form such that the source system 20 can issue the electronic form to the employees. The graphical control elements 13 are operable to provide interactive functionality to the electronic document from the source system 20. From there, the employees may input the appropriate information in the graphical control elements 13 and submit the data and a generated pdf copy of the executed form back into the source system 20. The form engine 10 may also communicatively link to the electronic form being transferred by the employee so as to extract the information that the employee inputted and retain that information in a data structure of a database (e.g., within the source system 20 itself and/or within a cloud storage system 18 of a cloud computing system 16).

The form engine 10 may be operable to communicatively couple to a plurality of source systems 20-1-20-N (where the reference "N" is an integer greater than or equal to "1" and not necessarily equal to any other "N" reference designated herein). In this regard, the cloud-based storage system 18 may be compartmentalized according to the source systems 20-1-20-N and operable to store/persist data of the source systems 20-1-20-N, such as the electronic forms, the data extracted from the electronic forms, the graphical control elements used by the source systems 20-1-20-N, etc. Alternatively or additionally, the form engine 10 may store/persist such data within a data store 14 of the form engine 10 (e.g., a database).

To illustrate, the form engine 10 may be communicatively coupled to the storage system 18. When a source system 20 needs an electronic form to be generated, the source system 20 may input an electronic file (e.g., an electronic image, a PDF, electronic document, or the like) to the form engine 10. The form engine 10 may then retrieve a plurality of graphical control elements 13 that are supported by the source system 20 for that form. In doing so, the form engine 10 may generate a template that controls placement of the graphical control elements 13 into the electronic file based on user-selectable cartesian coordinates. For example, the form engine 10 may provide a graphical user interface (GUI) 12 to an authorized user of the source system 20 that allows the user to select the electronic file and pull the graphical control elements 13 of the source system 20 into the form engine 10 where they may be laid upon the electronic file in the GUI 12 (e.g., via drag-and-drop) as deemed necessary by the user. In some embodiments, a combination of HTML, JavaScript, and/or Cascading Style Sheets (CSS) may be used to provide an "angular drag-and-drop" and "angular user interface bootstrap", both of which may be used to wrap JQuery user interface components for drag-and-drop GUI behaviors. Then, the form engine 10 may monitor an output of the user's selection and extract placement attributes (e.g., top, left, width, height, etc.).

From there, the form engine 10 may generate a template that includes the cartesian coordinates of the graphical control elements 13. These cartesian coordinates may instantiate placement in subsequent forms regardless of the size/resolution of the electronic files used create the subsequent forms. The form engine 10 may then persist the template in the storage system 18 in the portion of the storage system 18 reserved for the source system 20 for subsequent use in form generation. For example, once the template is created, the form engine 10 may authenticate a user of the source system 20, import an electronic file (e.g., from the source system 20, a website, a data store, etc.) at the direction of the user, and then retrieve the template from the storage system 18. Now, assume that the imported electronic file is a different size/scale than the generated template. The form engine 10 may use the cartesian coordinates of the graphical control elements 13 in the template to format placement of the graphical control elements 13 in the electronic file according to the size/scale of the electronic file to generate an electronic form for the source system 20.

To illustrate, assume that one of the graphical control elements 13 in the graphical user interface 12 has four coordinates representing a rectangle (e.g., a text entry field) with a first (x, y) coordinate at (25, 25), a second (x, y) coordinate at (75, 25), a third (x, y) coordinate at (25, 35), and a fourth (x, y) coordinate at (75, 35). Now assume that the electronic file being imported into the form engine 10 has a size/scale that is twice that of the template in both the x and y directions. The form engine 10 may then multiply the coordinate positions by two such that the graphical control element 13 is appropriately scaled within the electronic file with (x, y) coordinates of (50, 50), (150, 50), (50, 70), and (150, 70) relative to the template.

While this example illustrates how a graphical control element 13 is instantiated in the electronic file, it also illustrates that the graphical control element 13 is sized. However, in other embodiments, it may be unnecessary to resize the graphical control element 13. For example, a radio button is a type of graphical control element where one of a set of options can be selected. But, it may not be desired to increase the overall size of the radio button. Accordingly, the cartesian coordinates of the graphical control element 13 may just be used to adjust the placement of the graphical element 13 in the electronic file without resizing the graphical control element 13. Examples of graphical control elements 13 include, but are not limited to, radio buttons, check boxes, toggle buttons, split buttons, cycle buttons, sliders, this boxes, spinners, drop-down lists, menus, context menus, pie menus, menu bars, toolbars, ribbons, combo boxes, icons, tree views, grid views, navigations, links (e.g., URLs), tabs, scrollbars, text/value input fields, combo boxes, labels, tooltips, balloon helps, status bars, progress bars, info bars, containers, and the like.

In some embodiments, the form engine 10 is operable to generate electronic forms for individual purposes. For example, the form engine 10 may generate electronic forms that are used multiple times, such as the case with W-4's. However, the form engine 10 may also generate a template that includes a graphical control element 13 that provides for an electronic signature, among other things. And, as such, this template could be used to create a number of unique forms that simply include that graphical control element 13.

In some embodiments, the form engine 10 may be operable to automatically detect fields in an electronic document and select graphical control elements 13 that are relevant to the detected fields. For example, the form engine 10 may receive an unmapped PDF document (e.g., lacking graphical control elements and other features of the source system 20) for use in the generation of a user editable electronic form. The form engine 10 may scan the PDF document to identify various fields, such as text entry fields, check boxes, etc. The form engine 10 may then retrieve the appropriate graphical control elements 13 for those identified fields and insert those graphical control elements 13 into the fields. This electronic form may then be available to the source system 20 for subsequent use.

To illustrate with the employee example, an organization may need to transfer various forms to new hire before that person can begin employment. The source system 20 may transfer a form created by form engine 10 to the new hire such that the new hire can enter the appropriate data into the graphical control elements 13 of the electronic form. The new hire may then transfer the completed electronic form to the source system 20 via the form engine 10. Alternatively or additionally, the form engine 10 may have a link to the completed electronic form (e.g., a URL or a QR code) so as to obtain a copy of the completed electronic form. In any case, the form engine 10 may extract the data from the completed fields entered into the graphical control elements 13 of the electronic form. The form engine 10 may then generate a data structure for the new hire that includes information from the data entries and store the data structure in the storage system 18 for subsequent access by the source system 20. In some embodiments, the form engine 10 may also be able to read handwritten text from the electronic form and extract the data therefrom.

In some embodiments, the form engine 10 may be operable to use the link to the completed electronic form to propagate subsequent changes to the electronic form. For example, when a user makes changes to the form through the form engine 10, the form engine 10 retains the link (e.g., the URL or the QR code) to the electronic form. Thus, when a user of the source system 20 needs to transfer the electronic form to another, the user of the source system 20 may simply access the link to the changed electronic document. In other words, the link to the document is maintained regardless of changes made to the document until the document is no longer needed.

As used herein, a source system 20 is any device, system, software, or combination thereof operable to provide an interface to an organization for interaction by external users for the organization to function. Examples of the externals users include employees, potential employees, contract personnel, marketing personnel, business associates, and the like. The source system 20 may be external to the cloud computing system 16 or a part of the cloud computing system 16.

As used herein, the form engine 10 is any device, system, software, or combination thereof operable to interact with source systems 20 to retrieve artifacts (e.g., graphical control elements 13 and/or other modules and components used by the source system 20 and the generation of electronic forms) that are used by the source systems 20, and to generate electronic forms on behalf of the source systems 20. The form engine 10 generates the electronic forms using cartesian coordinates that instantiate the graphical control elements 13 in the electronic forms. The form engine 10 may be external to the cloud computing system (e.g., configured with a server), a part of the cloud computing system 16, and/or a part of a source system 20. Other exemplary embodiments of the form engine 10 are shown and described below.

Figure 2:
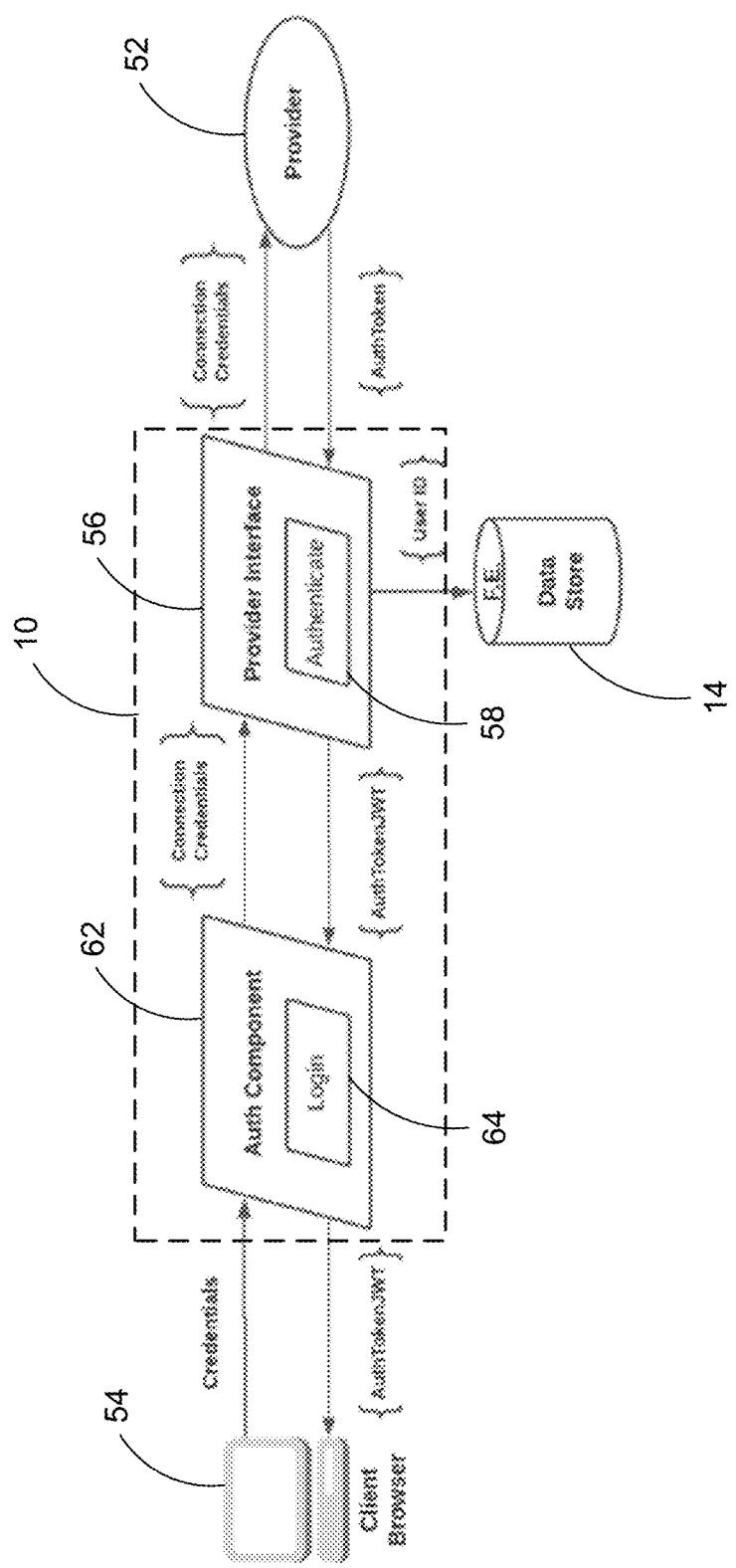
FIG. 2 is a block diagram of the form engine implementing an exemplary authentication process.

FIG. 2 is a block diagram of the form engine 10 implementing an exemplary authentication process. In this embodiment, a provider 52 (e.g., the cloud computing system 16 of FIG. 1) may direct a user in a client browser 54 to provide credentials such that the provider 52 may grant access to the user. For example, an employee being hired by an organization may receive a link (e.g., URL) to a website of the organization that allows the user of the client browser 54 to login (login module 64) of an authorization component 62 of the website. Upon a successful login, the form engine 10 may receive these credentials of the user via the authorization component 62.

The form engine 10 may also provide an interface for the provider 52 such that the form engine 10 can transfer connection credentials indicating the successful login to the provider interface 56 for authorization by the provider 52. The provider 52, upon authenticating the connection credentials of the user, may then transfer an authorization token to the provider interface 56 of the form engine 10. The provider interface 56 may then authenticate the authorization token of the provider 52 via an authentication module 58 and retain the user ID in the data store 14 of the form engine 10 for subsequent authorizations. The authentication module 58 may then generate a JSON Web Token and transfer that token to the authorization component 62 such that the user of the client browser 54 may receive various electronic forms generated by the form engine 10.

Of course, this authorization aspect of the invention is not intended to be limited to simply an employee receiving electronic forms generated by the form engine 10. Rather, the authorization may also pertain to a user of a source system 20 such that the user of the source system 20 can generate other electronic forms. For example, once the user of a source system 20 receives authorization from the provider 52, the user may be able to retrieve templates from the provider 52 to generate electronic forms via the form engine 10. An example of such is illustrated in FIG. 3.

Figure 3:
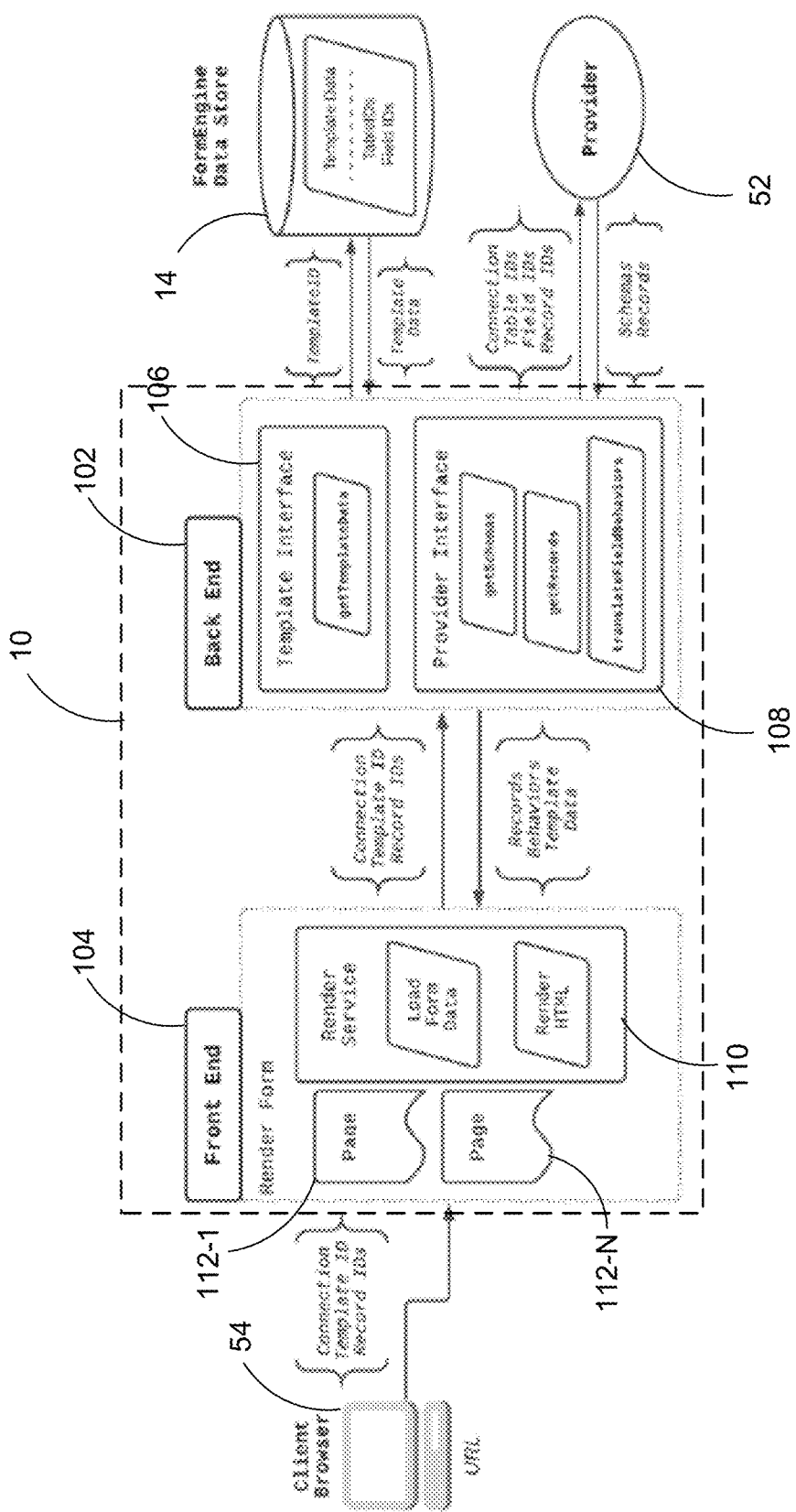
FIG. 3 is a block diagram of the form engine implementing an exemplary build of a form.

FIG. 3 is a block diagram of the form engine 10 implementing an exemplary build of a form. In this embodiment, the user of the client browser 54 may access a front end 104 of the form engine 10 via a GUI to begin generating an electronic form. In this regard, the user may import one or more pages 112 comprising PDFs, images, electronic documents, and the like (collectively "electronic files"). The user may then retrieve a template from the data store 14 and/or graphical control elements 13 via a template interface 106 of the form engine 10 for the rendering of an electronic form in a front end 104 of the form engine 10 (e.g., via a rendering module 110). For example, the user may retrieve a template with instantiated graphical control elements 13. The user may then use that template to instantiate the graphical control elements 13 of the template onto an electronic file, as shown and described above. Then, the user may render that file with the template into a new electronic form for use by the source system 20. In this regard, the user may transfer the new electronic form to a backend component 102 of the form engine 10 and store that new form with the provider 52 (e.g., in the compartmented space of the source system 20 in the cloud storage system 18). Alternatively or additionally, the user may retrieve the graphical control elements 13 to generate a template in the pages 112. The user may then transfer the template for storage in the data store 14 and/or with the provider 52. The pages 112 may be imported from any of a variety of sources including Internet webpages, the provider 52, the data store 14, etc. In whatever the case, the form engine 10 is operable to import a page 112 and convert that page into a user editable form with extractable data.

Figure 4:
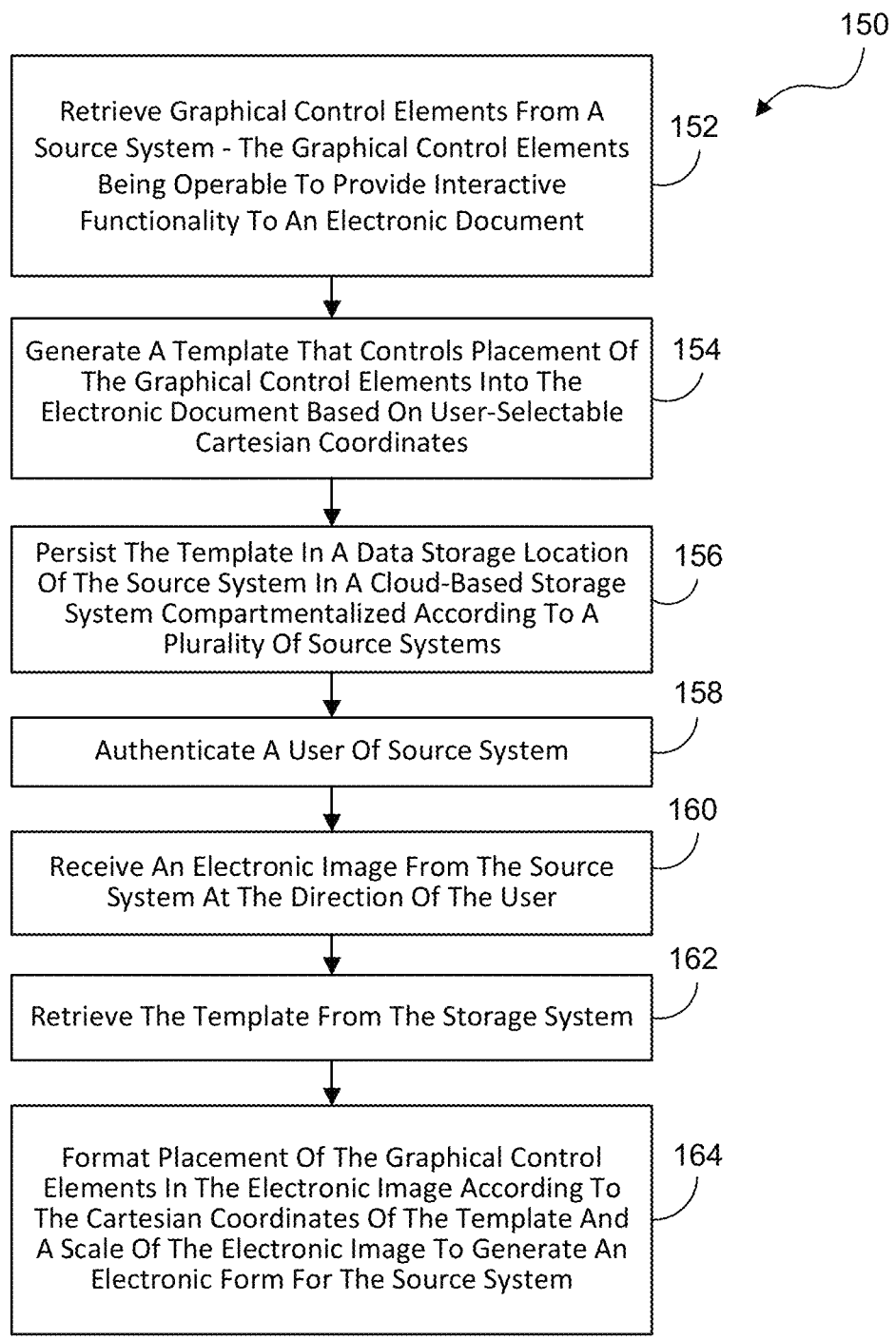
FIG. 4 is a flowchart of an exemplary process of the form engine.

Generally, any visual artefact which can be represented by a series of images can be imported as a template, including HTML, pages. This may be leveraged by placing graphical controls onto an individual page image using relative position (i.e., cartesian coordinates). The behavior of each graphical control is described by a schema of the provider 52. The form engine 10 may label this state of data as a template. And, a form may be considered a template that is populated with data from the provider 52. This data is located using the Record ID's and requested from the Tables associated with the Graphical controls there-in. FIG. 4 is a flowchart of an exemplary process 150 of the form engine 10. In this embodiment, the process 150 illustrates the flow of a template used to create an electronic form being generated by the form engine 10 as well as the creation of an electronic form. The process 150 may initiate (e.g., after authorization of a user of the form engine 10) by the user retrieving one or more graphical control elements 13, in the process element 152, such that the user can provide interactive functionality to an electronic document via a template. In this regard, the user may generate the template in a manner that controls the placement of the graphical control elements 13 in the electronic document. For example, the form engine 10 may provide a GUI to the user that allows the user to drag-and-drop the graphical control elements 13 into a template based on user-selectable Cartesian coordinates, in the process element 154, as described hereinabove.

Once the template is generated, the form engine 10 may persist the template in a data storage location of the source system 20 of the cloud-based storage system 18, in the process element 156. Then, when a new form needs to be generated, a user may authenticate himself/herself into the form engine 158 as described above, in the process element 158. The user may then request and receive or otherwise import an electronic file (i.e., an image, PDF, electronic document, or the like) from the source system 20, in the process element 160, and retrieve the template from the storage system 18, in the process element 162. From there, the user may use the template to format placement of the graphical control elements 13 in the electronic file according to the Cartesian coordinates of the template and a scale of electronic file to generate a new electronic form for the source system 20, in the process element 164. That is, the form engine 10 may direct placement of the graphical control elements 13 onto the file according to the Cartesian coordinates of the template where they may be scaled according to the size/resolution of the file, as described above.

Figure 5:
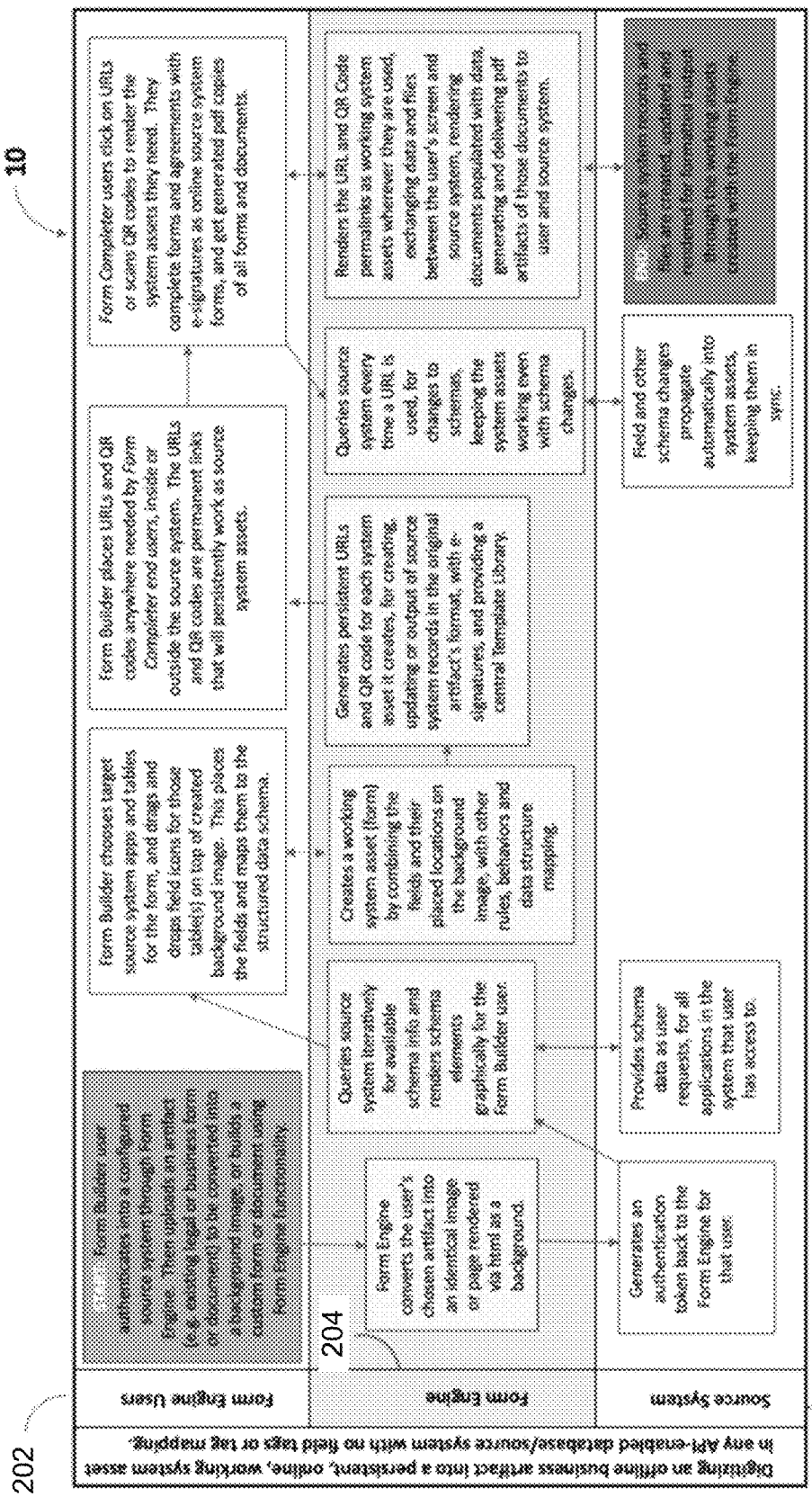
FIG. 5 is an exemplary flow diagram of the form engine's creation of a working system asset from an offline business artifact.

FIG. 5 is an exemplary flow diagram of form engine 10's "no-code" creation of a working system asset from an offline business artifact. In FIG. 5, the form engine 10 is illustrated with a user's component 202 that enables a user-authenticated API querying of target source systems 20 to determine where and how business forms, documents, and other assets in PDF (portable document format), Word, html, and/or image file formats (e.g., "artifacts") can be integrated. The form engine 10 enables real-time, drag-and-drop mapping of unstructured artifacts to structured databases by users, and converts the offline business artifacts into working "system assets" in dynamically changing source systems 20. The form engine 10 thus creates system assets that are durable, persistent custom forms, documents, and/or images that automatically update themselves from changes in the source system 20's schemas (e.g., changes in a field type or property). These changes are also interactively updatable by the form builder user (e.g., by changing a field's position or other property on a form, replacing the background business artifact, etc.).

Figure 6:
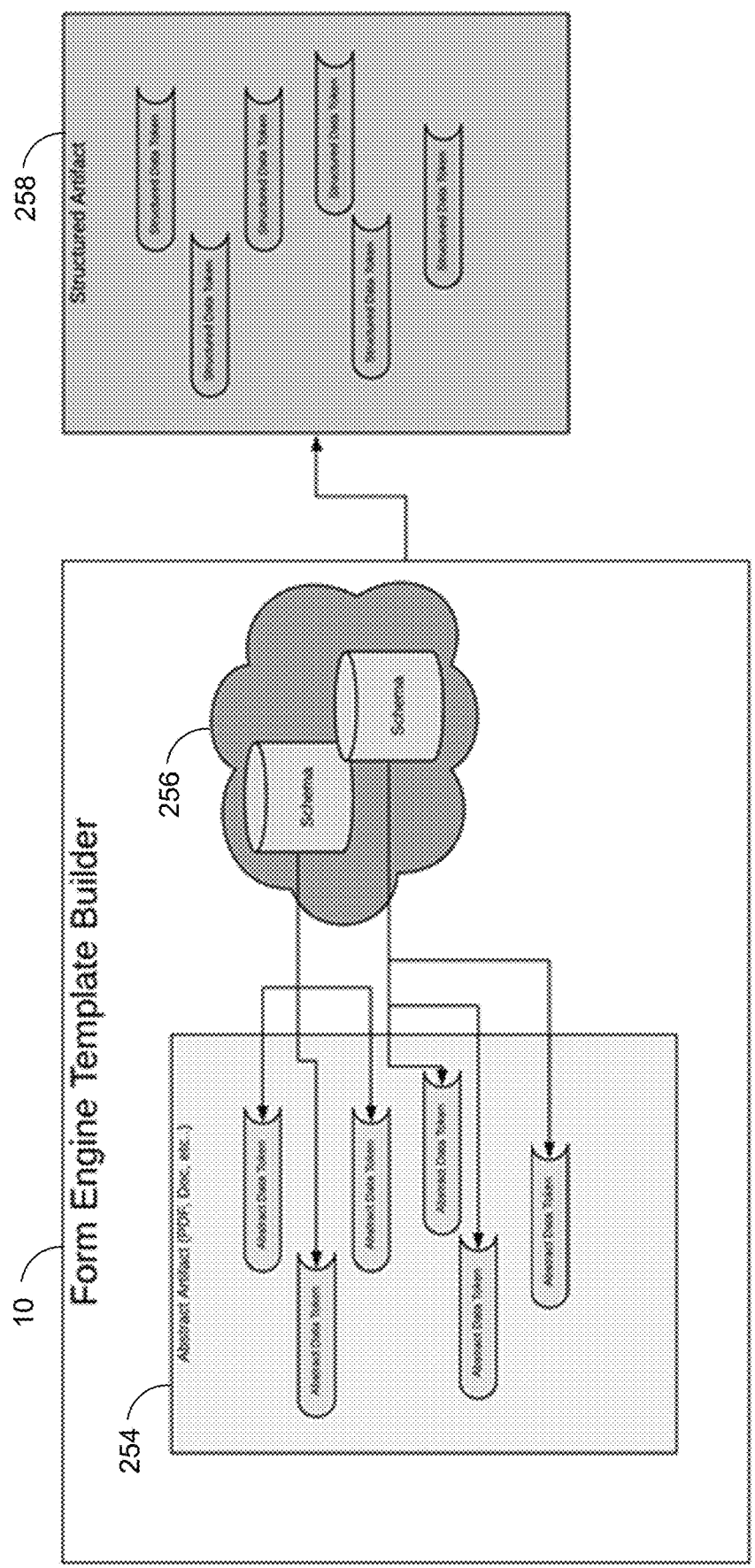
FIG. 6 is a block diagram of the form engine operating on exemplary unstructured abstract artifacts having schematic elements to convert them into structured artifacts.

FIG. 6 is a block diagram of the form engine 10 operating on exemplary unstructured abstract artifacts 254 having schematic elements (e.g., source system schemas 256) to convert them into structured artifacts 256. The form engine 10, in this embodiment, may enable the user to interactively map and place authorized, schematically-bound source system fields over the top of an artifacts' (e.g., artifacts 254) graphic reproduction as a background image with cartesian coordinates that determine each field's position on the form, including the elements to support multiple and related database records on the same form. This no-code, drag-and-drop field mapping enables custom, structured data source system asset creation from substantially any business form, document, or image artifact (e.g., artifacts 254).

This construct enables interactive mapping of schematic/structured context onto an unstructured artifact 254, using dynamically queried source system schemas that specify the fields and metadata, and structured relationships between fields, tables, and applications in the source system.

For example, the form engine 10 may dynamically query the source system 20's schemas 258 and render live fields as visual mapping objects on top of the artifacts 254 that are converted to background images or html pages. These are built using the form engine 10's custom form builder. This replaces the current technology of creating generic fields on a blank canvas or background images outside the source system, and then using a separate mapping component to manually connect them to source system fields. With the form engine 10, the user works with real fields queried from the source system schemas 258. The system assets then have a persistent connection to live source system fields. Thus, the form engine 10 can automatically update the system assets if field properties change in the source system 20.

Additionally, the system assets may be used for creating, editing, and/or rendering source system data in the artifact's custom format with PDF generation, all in one. The system assets can also create, update, and/or render one or more structured, related data records, to or from one or more tables in the source system, or multiple source systems, from a single system asset submission. For example, a form engine template builder may generate a form (e.g., using a data-parsed PDF, an OCR'd PDF, a form template, etc.). The form engine template builder may then use abstract artifacts 254 from the system schemas 256 to incorporate into the form. The fields within the form may then be used throughout a source system 20 (e.g., an enterprise wide source of data) to update fields in other forms within the source system 20. These fields may also be used by other source systems 20. For example, after generating the form, the form engine 10 may allow those fields to be shared among source systems 20 of differing entities. Data that the system assets sends into the source system 20 automatically and persistently carries the source system 20's data validation as well, ensuring data integrity.

In data parsing, data may flow in packages between heterogeneous data stores where is either extracted or loaded using a variety of data types. Integration sources do the work of extracting data, parsing string data, and converting data into an integration services data type. Subsequent transformations may parse data to convert it to a different data type, or create column copies with different data types. And, when the data is loaded into a data store, the destination may parse the data to convert it to a data type that the destination uses.

In some embodiments, the form engine 10 allows replacement of background images by importing replacement templates behind field objects that stay in place. For example, the form engine 10 may generate a form with a background image. The form may have several drop down and dialog boxes integrated therewith. Then, if a user wishes to change the background image, the form engine 10 may retrieve an image that the user desires and replace the present background with the uploaded image, without disrupting the mapped fields on the form, or breaking existing URL and QR Code permalinks for the system asset. The form engine 10 may also allow replication of system asset mapping to additional common artifacts by replacing background images, making any field adjustments as needed, and/or saving them to create a new system asset. The form engine 10 similarly allows the functionality above with editing of a custom form built.

A system asset's mapping for a background image can also be replicated to additional source system tables with matching schema. This may be applicable when replicating a system asset to other source system instances, copies of applications and/or tables.

The form engine 10 also uses its standard mapping of an artifact, and PDF data parsing or Optical Character Recognition (OCR), to scan/read the data out of artifacts that have already been manually populated with data. The form engine 10 may populate the structured source system artifacts 258 with the data read from the PDFs. The form engine 10 can process the data in PDFs and the PDFs themselves into a target source system 20 in volume, as they are stored in an accessible folder for processing.

The form engine 10 may also use OCR to read field labels on artifacts. Then, a matching algorithm of the form engine 10 may auto-match and map the artifacts to a queried list of fields in user-selected source system target tables. This auto-mapping helps automate the field mapping and system asset creation process. The form engine 10 may visually move source system field objects onto the background image and align them over the matching fields in the background. And, the user can then finalize the field mapping alignment by further dragging the fields onto the background.

For use cases where the target source system fields do not yet exist or are incomplete for mapping to an artifact, the form engine 10 may algorithmically create a list of fields it reads on the artifact that it cannot match to source system fields, and enable the user to create those fields in the target source system table via an interface of the form engine 10. This lets the user edit field names, specify field types, and/or other properties, and bulk create them in the source system. The form engine 10 can then auto-map fields and/or allow a user to manually map to the artifact background to complete creating the system asset.

In some embodiments, the form engine 10 uses three categories of data types: forms; metadata; and authentication/authorization. There may also be three rest repositories for this data: the provider (e.g., a source system 20); form engine data storage; and a user's browser.

Generally, the form engine 10 receives transport requests over HTTPS using secure versions of transport layer security in a cloud service. Additionally, cloud service processing is inherently stateless, meaning it retains no information and is provided with all relevant data necessary to process.

Authentication and authorization data can begin at the login/registration screen of the front-end of the form engine 10. For example, a user may provide their authentication credentials or "OAuth approval" and the form engine 10 may relay the request to the provider via a cloud services function (CF e.g., the cloud computing system 16). The provider may supply its response to the CF and, if successful, a JSON Web token (JWT) may be stored in the user's browser along with an Auth token. Generally, any form engine request to the provider requires the user to supply the JWT to access or maintain provider data.

In some embodiments, the form engine 10 uses metadata (e.g., a field's position on a form, the background image, table, and field ID) to generate new forms. For example, a user may upload a new template and select an application. The CF retrieves the user's authorized table and field IDs. The user may then select a tables field and "drop" it onto a generated form. The IDs for the selected table, the field, its size, and location are saved in a cloud datastore. Form data may be transmitted between the provider and the user's browser through the stateless CF. The data is generally not stored outside of the provider.

To illustrate, an end-user (e.g., a form completer) may submit a new patient registration form at a clinic. The information the user provided may then be transferred to the stateless CF. The CF sends the request directly to the provider. The provider's response (success or failure) may then be returned to the user. Generally, form data is stored with the provider and/or on the user's browser. The form engine 10 generally does not store any form data. Rather, the form engine 10 stores metadata in the CF, protected via authentication and access rules (e.g., using Google's Firebase for data security). Files, such as form templates, are generally stored on the CF. And, the metadata is stored in a datastore of the CF.

In some embodiments, and organization's user (e.g., a form builder), via the form engine 10, can change a target source system they are working with by simply logging out and logging in again to the form engine's interface, specifying the target source system and entering their credentials for that source system. This may cause the form engine 10 to obtain a new token, open a library of system assets for that source system that the user has access to based on their token permissions, and/or enable that user to create new system assets or work with existing ones, all from the same user interface.

In some embodiments, persistent URLs and QR codes (collectively "permalinks") are created for each working system asset can be used inside or outside of target source systems. For use outside the source system, the URLs can work as hyperlinks in any document, webpage, email, or other electronic display. Similarly, QR codes can be pasted as images in any electronic display, or printed or displayed. The system assets behind them may then be rendered by a smart phone and/or other mobile device (e.g., cameras, readers, etc.), enabling easy mobile use of the system asset.

In some embodiments, the system assets query the form engine 10 and source system 20 for schema or configuration changes each time they are used, and updates how they work for the user automatically for any changes. This architecture may provide for real-time central control of all system assets from the processor's library, which itself is accessible with source system authentication from virtually any web browser.

In some embodiments, the form engine 10 is a real-time database application hosted in the cloud, requiring no client-side software or other plugins to function. And, the form engine 10 is generally agnostic of source systems 20 it integrates with. As a browser-based web application, it can be used inside or outside a suitable source system 20, and interact with multiple source systems 20 interchangeably and simultaneously through the same interface, using the user's API authentication to enabled source systems.

In some embodiments, to provide security, the form engine 10 uses direct source system-provided connections and source system supported authentication to avoid needing to store any source system data outside the source system 20 at any time. This is a substantial security improvement over current practice of moving and storing data outside the source systems 20.

In some embodiments, the form engine 10 executes document generation and upload processes automatically via a web request eliminating the need for manual execution, generation, and/or migration of live data documents. An example would be using a scheduled daily script to render the data-populated, formatted PDFs the form engine 10 enables, and email them to users and/or send them to another source system 20. This second-level automation is possible with the generated URLs that can be executed by script programmatically as well as by user in the form engine 10 interface.

In some embodiments, the form engine 10 OCRs read field labels on artifacts, and auto-matches and maps the artifacts to a queried list of fields in source system target tables. The auto-mapping automates field mapping on a formatted background image. With the click of a button, the form engine 10 may move source system field icons onto an artifact background image and align them over the matching fields in the background text. The form engine 10 may also highlight fields it believes are missing on the background image, for the user to match with a source system field, or click to ignore. The form engine 10 can then finalize the field mapping alignment by further dragging the fields on the background and saving the resulting system asset.

In some embodiments, the form engine 10 machine learns to accurately read field labels on artifacts and map source system fields accurately over them. This improves the form engine 10's ability to record the placement and positioning of source system fields relative to the background image text and graphical elements (checkboxes, form input boxes, underlines) in saved system assets.

Figure 7:
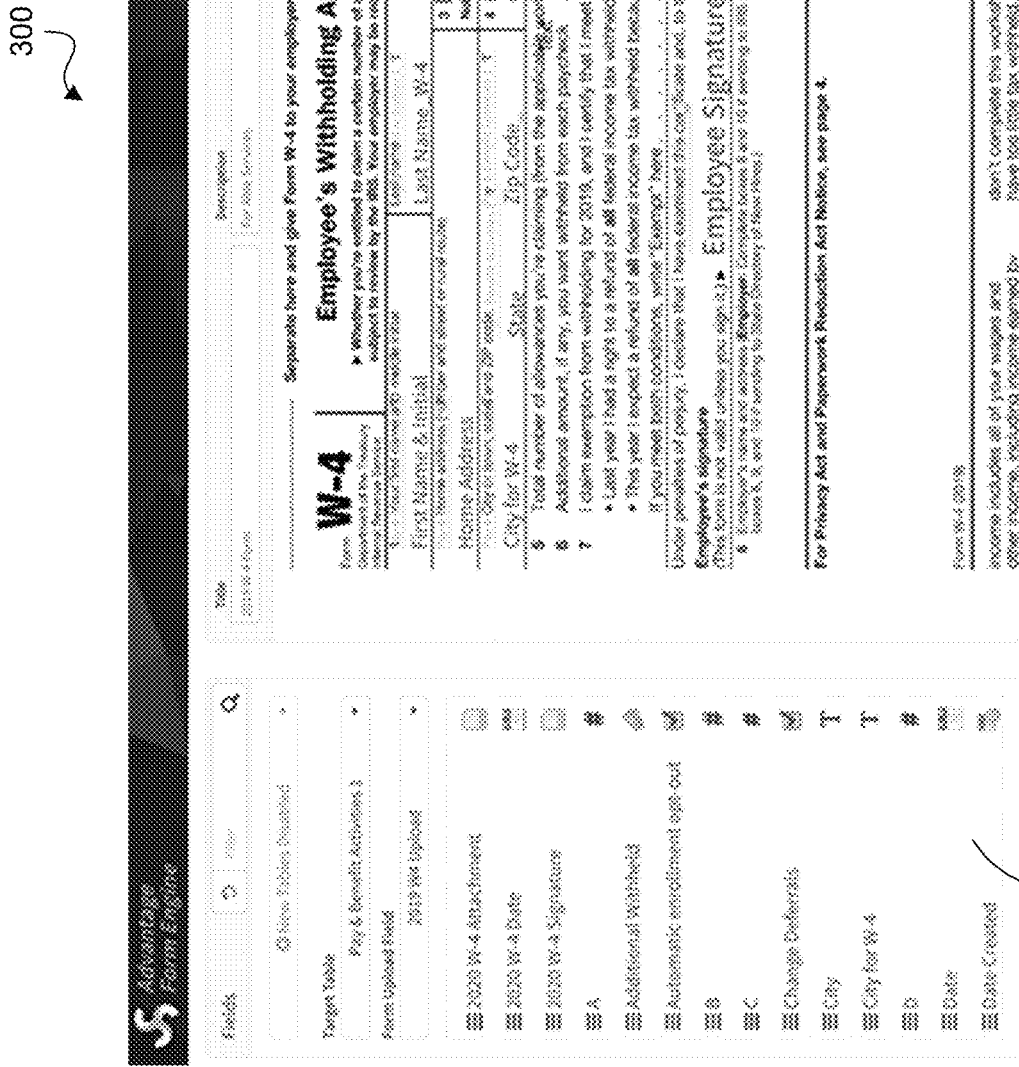
FIG. 7 is an exemplary screen shot of a working form that was created by the form engine.

FIG. 7 is a screen shot of a working and exemplary home screen 300 displaying the library of system assets 302 from forms digitized for a source system by the form engine 10. In this embodiment, a user can select and work with any system asset that has been created and saved, either accessing the permalink URLs for that asset, or modifying the asset. For example, the form engine 10 may provide drag-and-drop building of a new system asset over a converted artifact background image, with fields and schema mapping. In this exemplary embodiment, the user selected an Internal Revenue Service (IRS) form W-4. A "form builder" of the form engine 10 user uploads a W-4 form in PDF form from the IRS website or other source, and chooses a target application and table(s) from the source system 20. A user may then drag and drop the fields from the target table, displayed in the left panel, onto the form in their positions, such as "first name and initial", "last name", "address", etc., such that a subsequent user may fill out the form on a computer by filling out the entry fields of the artifacts. For example, once the form populated with the appropriate fields, the form engine 10 may create the permalink URLs and QR codes that render the W-4 form as a working online form tied to the target source system application and table. The permalinks may then be sent to a prospective employee (e.g., via a QR code, a weblink, or the like) to fill out the form.

The end user may see this as a normal online form to complete, with e-signature where needed, and the fields carry the source system's field validation (e.g. field type, multiple choice options, etc.). The end user may then complete the form such that the form engine 10 may generate a PDF copy of the signed, executed form the for the end user, and transfer the mapped data and a copy of the generated PDF into the source system target table(s).

In some embodiments, when structured artifacts are not capable of fulfilling fields in a form, the form engine 10 may generate artifacts that are capable of fulfilling those fields. The form engine 10 may then insert these additional artifacts in the form.

Once the form is created, the form engine 10 may synchronize the form, the structured artifacts and/or the additional artifacts such that they may be used throughout the source system 20 and/or by another enterprise source system 20.

Figure 8A:
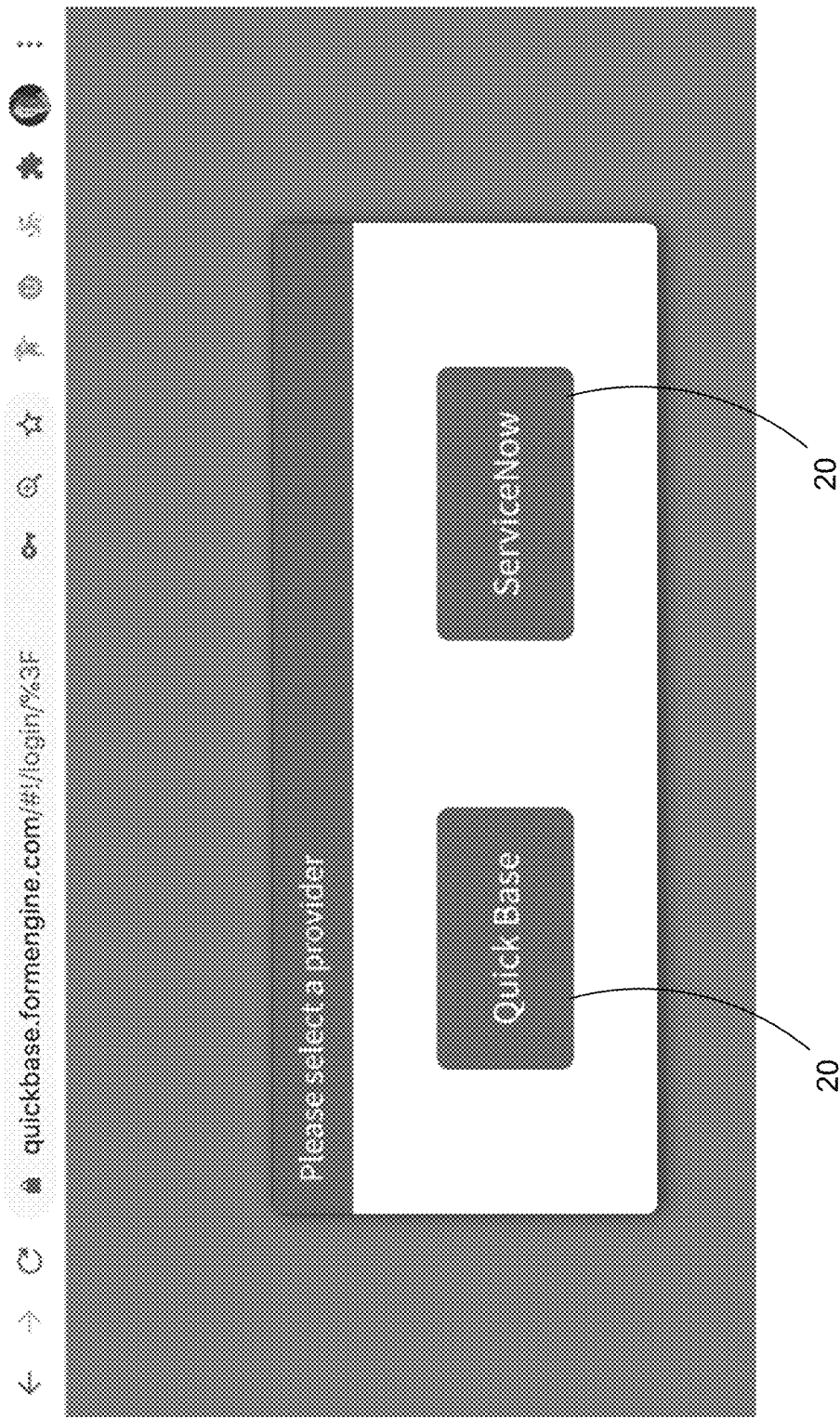
Figure 8B:
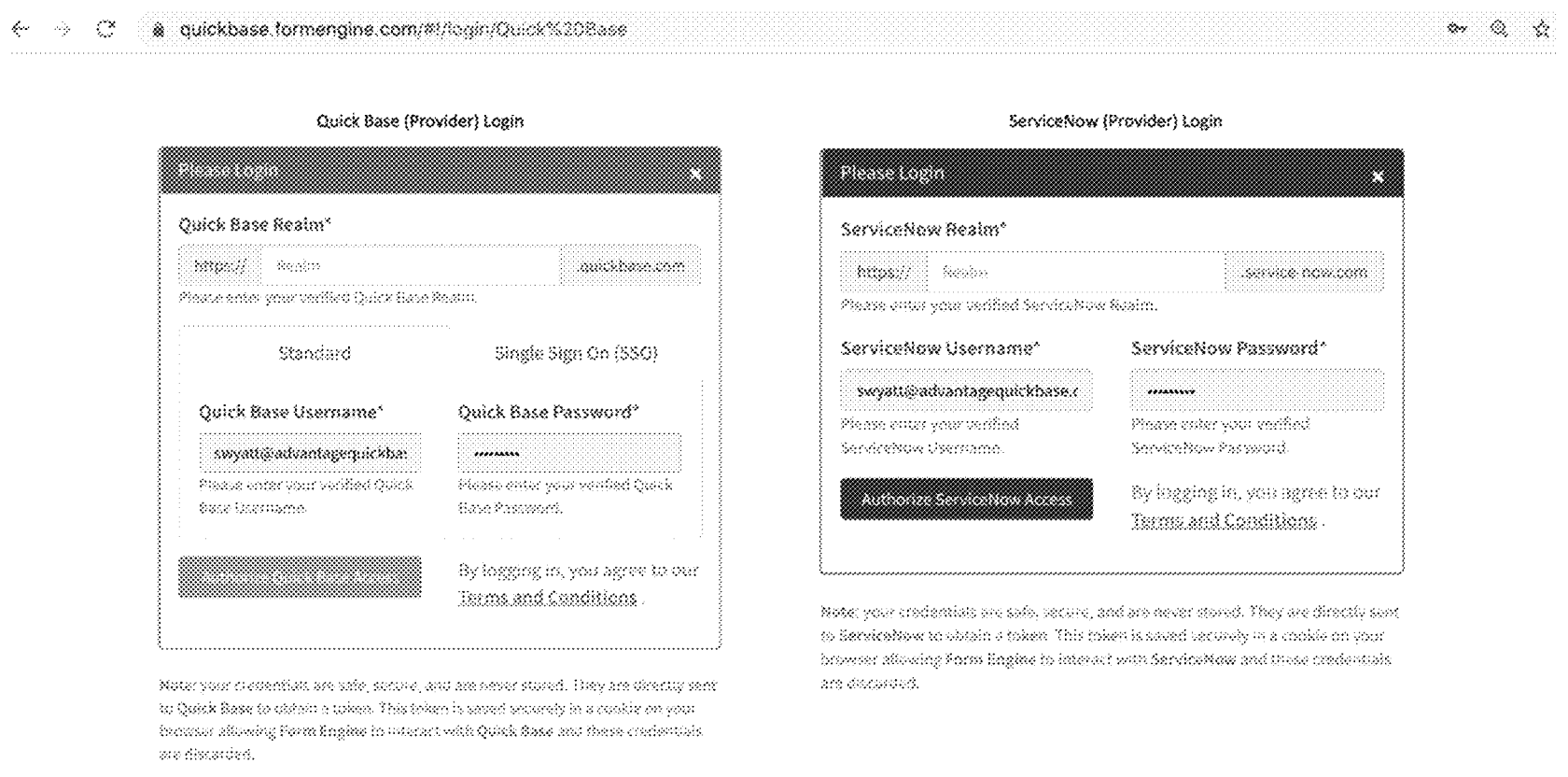
Figure 8C:
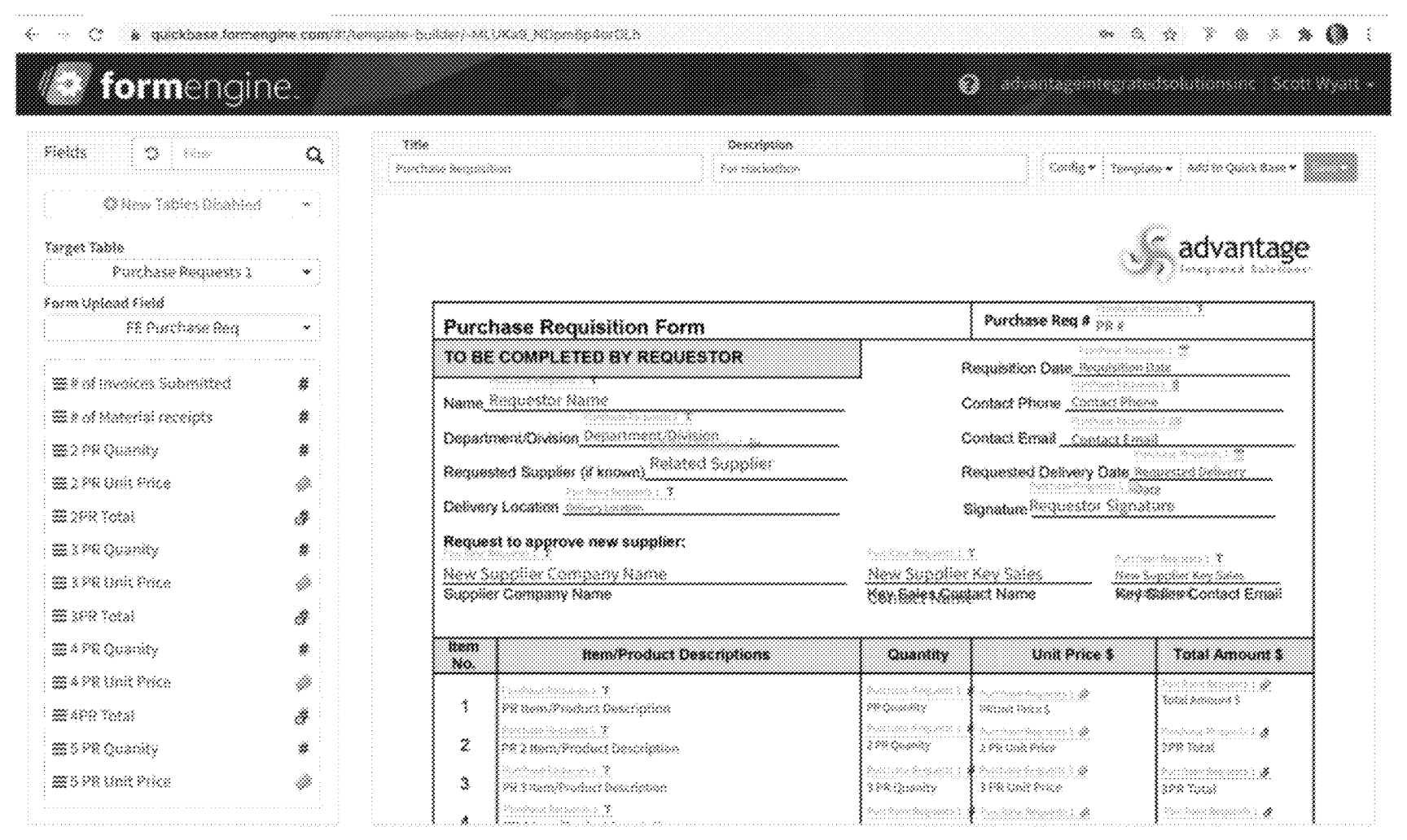
Figure 8D:
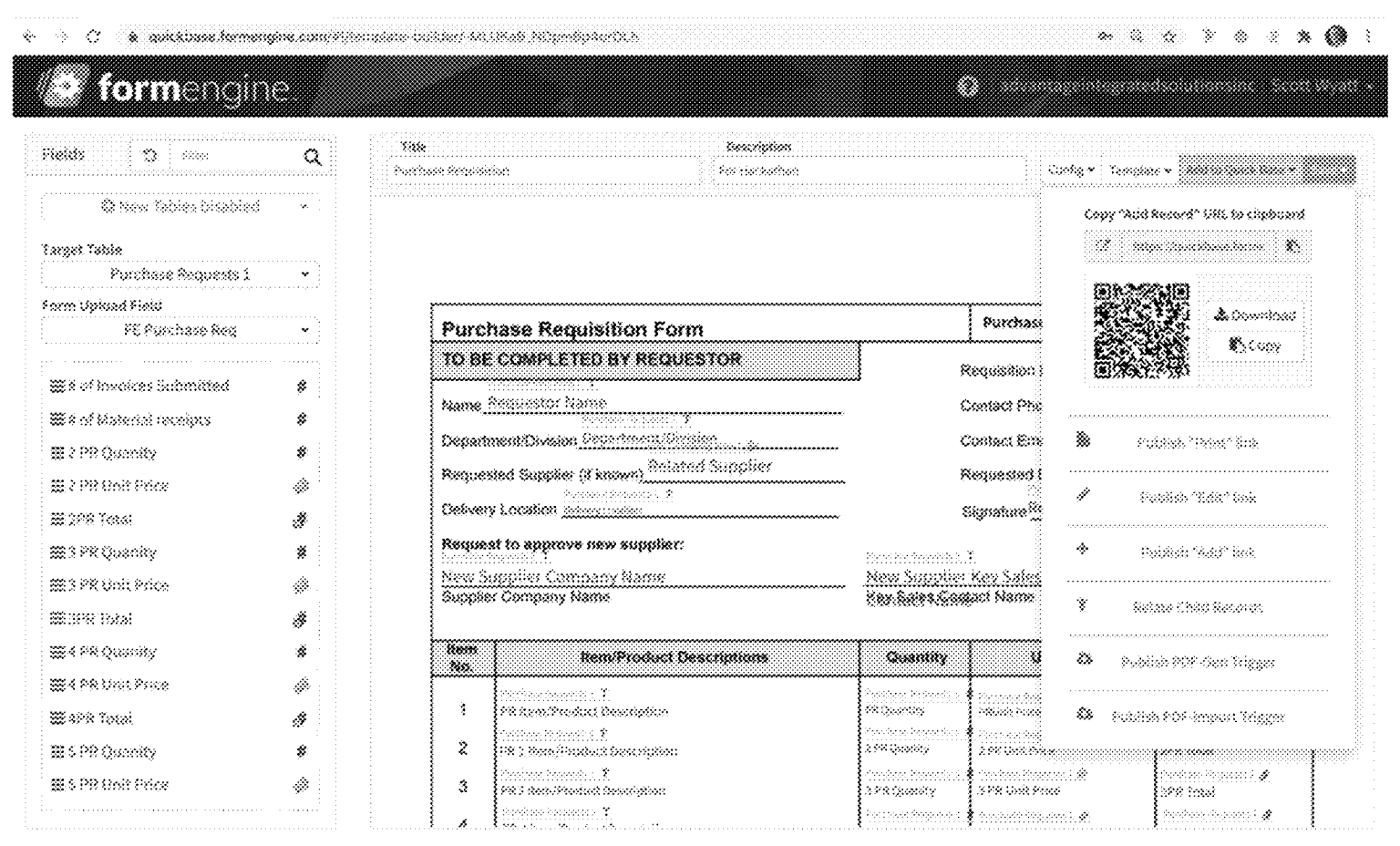
Figure 8E:
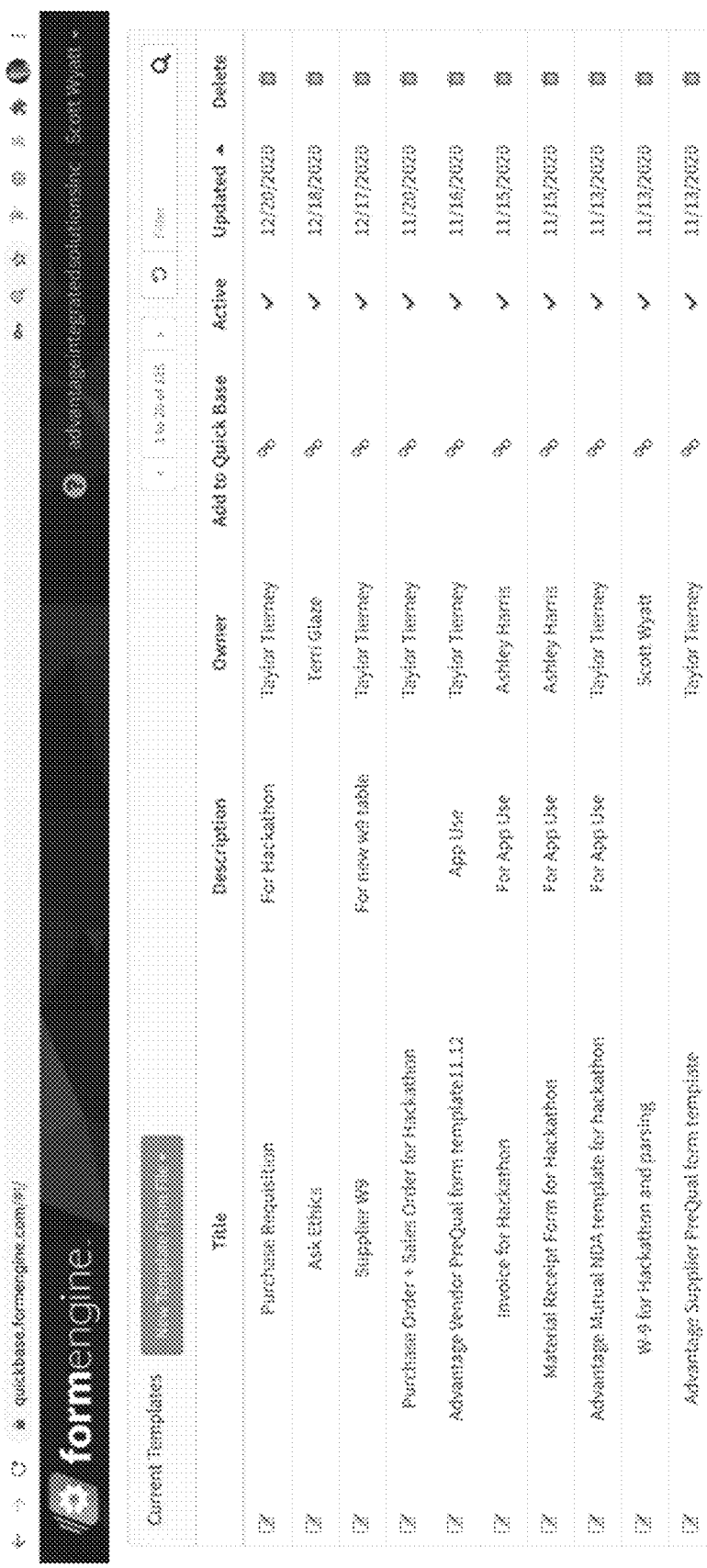

FIGS. 8A-8E illustrate screenshots of exemplary GUIs of the form engine. For example, FIG. 8A illustrates the selection of a source system 20 for which an electronic form may be generated. FIG. 8B illustrates the authentication of a user into the selected source system 20. FIG. 8C illustrates the creation of the form by the form engine 10 in which graphical control elements are instantiated in the electronic form. FIG. 8D illustrates the completion of the electronic form and the various options to publish the form and/or provide relationships between other electronic forms generated by the form engine 10. And, FIG. 8E illustrates a library of electronic forms created by the form engine 10 and the personnel who generated each electronic form.

Figure 9:
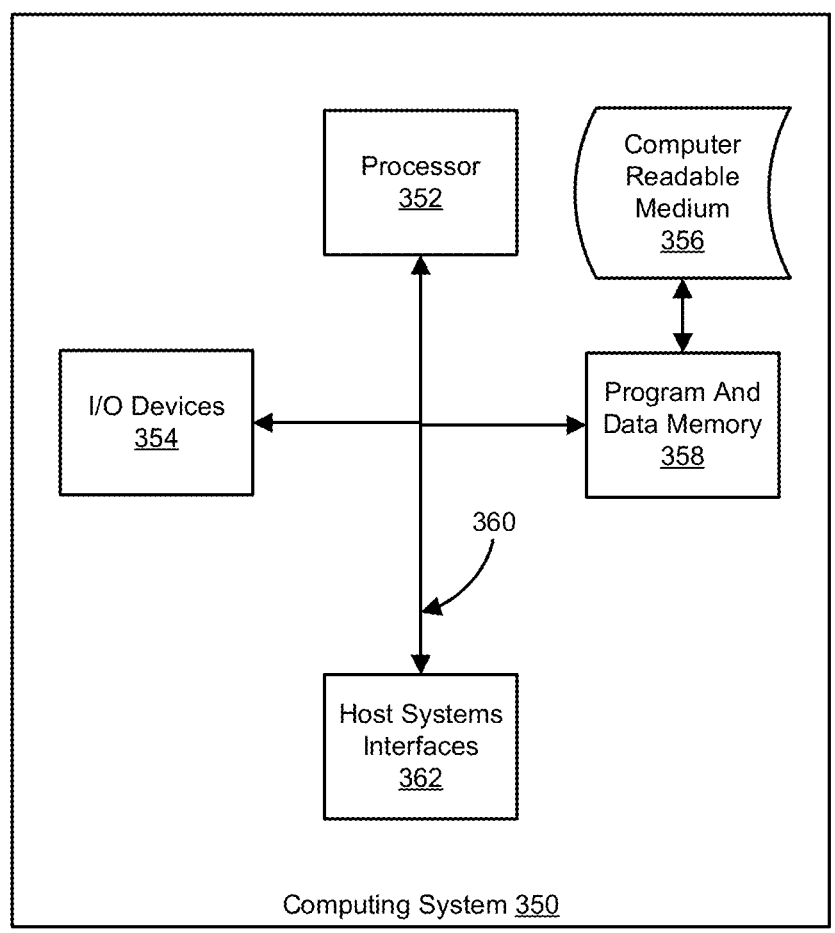
FIG. 9 is a block diagram of an exemplary computing system in which a computer readable medium provides instructions for performing methods herein.

Any of the above embodiments herein may be rearranged and/or combined with other embodiments. Accordingly, the invention is not to be limited to any particular embodiment disclosed herein. Additionally, the invention can also take the form of an entirely hardware embodiment or an embodiment containing both hardware and software elements. FIG. 9 illustrates a computing system 350 in which a computer readable medium 356 may provide instructions for performing any of the methods disclosed herein.

Furthermore, some aspects of the embodiments herein can take the form of a computer program product accessible from the computer readable medium 356 to provide program code for use by or in connection with a computer or any instruction execution system. For the purposes of this description, the computer readable medium 356 can be any apparatus that can tangibly store the program code for use by or in connection with the instruction execution system, apparatus, or device, including the computing system 350.

The computer readable medium 356 can be any tangible electronic, magnetic, optical, electromagnetic, infrared, or semiconductor system (or apparatus or device). Some examples of a computer readable medium 356 include solid state memories, magnetic tapes, removable computer diskettes, random access memories (RAM), read-only memories (ROM), magnetic disks, and optical disks. Some examples of optical disks include read only compact disks (CD-ROM), read/write compact disks (CD-R/W), and digital versatile disks (DVD).

The computing system 350 can include one or more processors 352 coupled directly or indirectly to memory 358 through a system bus 360. The memory 358 can include local memory employed during actual execution of the program code, bulk storage, and/or cache memories, which provide temporary storage of at least some of the program code in order to reduce the number of times the code is retrieved from bulk storage during execution.

Input/output (I/O) devices 354 (including but not limited to keyboards, displays, pointing devices, I/O interfaces, etc.) can be coupled to the computing system 350 either directly or through intervening I/O controllers. Network adapters may also be coupled to the computing system 350 to enable the computing system 350 to couple to other data processing systems, such as through host systems interfaces 362, printers, and/or or storage devices through intervening private or public networks. Modems, cable modems, and Ethernet cards are just a examples of network adapter types.

What is claimed is:

1. A system, comprising:

A cloud-based storage system compartmentalized according to a plurality of source systems, the storage system storing data of the source system;

the data includes at least a database table storing fields wherein each of the fields corresponds to a graphical control element;

a form engine configured in a computing device that is communicatively coupled to the storage system, the form engine presenting a graphical user interface (GUI) to a first user for retrieval of graphical control elements from a first of the source systems, wherein the graphical control elements provide interactive functionality to an electronic document that allows an end user to input data, wherein the form engine generates a template in response to a user selection and placement of at least a plurality of the graphical control elements, wherein the template controls the placement of the selected plurality of graphical control elements into the electronic document based on user-selected cartesian coordinates entered via the GUI, and persists the template in the storage system according to the compartmentalized portion of the first source system, wherein, via the GUI, the form engine further authenticates the first user of the first source system, imports an electronic file at the direction of the first user, retrieves the template from the storage system, and formats the placement of the selected plurality of graphical control elements in an online version of the electronic file for the first source system according to the cartesian coordinates of the template and a scale of the electronic file, In response to the imported electronic file, the form engine further automatically reads content and metadata of the electronic file to detect fields in the electronic file, detects the fields in the database table of a first of the source systems, selects at least a portion of the detected fields in the electronic file that are relevant to the detected fields of the database table of the first source system, matches the selected at least a portion of the detected fields in the electronic file to the detected fields in the database table, inserts the corresponding graphical control elements associated with the matched portion of the detected fields into the online version of the electronic file.

2. The system of claim 1, wherein:
the first source system transfers the electronic form file to a second user for data entry into the graphical control elements in the electronic file; and
the form engine communicatively links to the electronic file via the first source system, extracts data entries from the graphical control elements in the electronic file, generates a data structure for the second user that includes information from the data entries, and stores the data structure in the storage system for subsequent access by the first source system.

3. The system of claim 2, wherein:
the form engine further reads handwritten text from the electronic file.

4. The system of claim 2, wherein:
the form engine further communicatively links to the electronic file via at least one of a uniform resource locator (URL) or a quick response (QR) code.

5. The system of claim 4, wherein:
the form engine further automatically propagates subsequent changes to the electronic file via the URL or the QR code to the first source system.

6. The system of claim 1, wherein the form engine further:
in response to the imported file, generates new fields in the database table of the first source system based on the detected fields in the electronic file when one or more of the fields in the electronic file do not exist in the database table of the first source system.

7. The system of claim 1, wherein the form engine further:
in response to the imported file, generates new fields in a database table of a second of the source systems based on the on-line version of the electronic file.

8. A method, via a form engine, comprising:
presenting a graphical user interface (GUI) to a first user for retrieval of a plurality of graphical control elements from a first source system, wherein the graphical control elements are operable to provide interactive functionality to an electronic document that allows an end user to input data;
via a form engine:
generating a template in response to a user selection and placement of at least a plurality of the graphical control elements, wherein the template controls placement of the selected plurality of graphical control elements into the electronic document based on user-selected cartesian coordinates;
persisting the template in a data storage location of the first source system in a cloud-based storage system compartmentalized according to a plurality of source systems, the storage system storing data of the source systems, and the data includes at least a database table storing fields wherein each of the fields corresponds to a graphical control element;
via the GUI:
authenticating the first user of the first source system;
importing an electronic file at the direction of the first user;
retrieving the template from the storage system; and
formatting the placement of the selected plurality of graphical control elements in an on-line version of the electronic file for the first source system according to the cartesian coordinates of the template and a scale of the electronic file; and
via the form engine:
in response to the imported file, reading metadata of the electronic file to detect fields in the electronic file;
detecting fields in a database table of a first of the source systems;
selecting at least a portion of the detected fields in the electronic file that are relevant to the detected fields of the database table of the first source system;
matching the selected at least a portion of the detected fields in the electronic file to the detected fields in the database table; and
inserting the corresponding graphical control elements associated with the matched portion of the detected fields into the on-line version of the electronic file.

9. The method of claim 8, further comprising:
transferring, from the first source system, the electronic file to a second user for data entry into the graphical control elements in the electronic file; and
via the form engine:
communicatively linking to the electronic file via the first source system;
extracting data entries from the graphical control elements in the electronic file;
generating a data structure for the second user that includes information from the data entries;
storing the data structure in the storage system for subsequent access by the first source system.

10. The method of claim 9, further comprising:
via the form engine, reading handwritten text from the electronic file.

11. The method of claim 9, further comprising:
via the form engine, communicatively linking to the electronic file via at least one of a uniform resource locator (URL) or a quick response (QR) code.

12. The method of claim 11, further comprising:
via the form engine, automatically propagating subsequent changes to the electronic file via the URL or the QR code to the first source system.

13. The method of claim 8, further comprising:
via the form engine:
in response to the imported file, generating new fields in the database table of the first source system based on the detected fields in the electronic file when one or more of the fields in the electronic file do not exist in the database table of the first source system.

14. The method of claim 8, further comprising:
via the form engine:
in response to the imported file, generating new fields in a database table of a second of the source systems based on the on-line version of the electronic file.

15. A non-transitory computer readable medium comprising instructions that, when executed by a processor, direct the processor to implement a form engine that:
presents a graphical user interface (GUI) to a first user for retrieval of a plurality of graphical control elements from a first source system, wherein the graphical control elements are operable to provide interactive functionality to an electronic document that allows an end user to input data;
via a form engine:
generates a template in response to a user selection and placement of at least a plurality of the graphical control elements, wherein the template controls placement of the selected plurality of graphical control elements into the electronic document based on user-selected cartesian coordinates;
persists the template in a data storage location of the first source system in a cloud-based storage system compartmentalized according to a plurality of source systems, the storage system storing data of the source systems, and the data includes at least a database table storing fields wherein each of the fields corresponds to a graphical control element;

via the GUI:
authenticates the first user of the first source system;
imports an electronic file at the direction of the first user;
retrieves the template from the storage system; and
formats the placement of the selected plurality of graphical control elements in an on-line version of the electronic file for the first source system according to the cartesian coordinates of the template and a scale of the electronic file; and via the form engine:
in response to the imported file, reads metadata of the electronic file to detect fields in the electronic file;
detects fields in a database table of a first of the source systems;
selects at least a portion of the detected fields in the electronic file that are relevant to the detected fields of the database table of the first source system;
matches the selected at least a portion of the detected fields in the electronic file to the detected fields in the database table; and
inserts the corresponding graphical control elements associated with the matched portion of the detected fields into the on-line version of the electronic file.

16. The computer readable medium of claim 15, further comprising instructions that direct the processor to:
transfer, from the first source system, the electronic file to a second user for data entry into the graphical control elements in the electronic file; and via the form engine:
communicatively link to the electronic file via the first source system;
extract data entries from the graphical control elements in the electronic file;
generate a data structure for the second user that includes information from the data entries; and
store the data structure in the storage system for subsequent access by the first source system.

17. The computer readable medium of claim 16, further comprising instructions that direct the processor to:
via the form engine, read handwritten text from the electronic file.

18. The computer readable medium of claim 16, further comprising instructions that direct the processor to:
via the form engine, communicatively link to the electronic file via at least one of a uniform resource locator (URL) or a quick response (QR) code.

19. The computer readable medium of claim 18, further comprising instructions that direct the processor to:
via the form engine, automatically propagate subsequent changes to the electronic file via the URL or the QR code to the first source system.

20. The computer readable medium of claim 15, further comprising instructions that direct the processor to:
via the form engine:
in response to the imported file, generate new fields in the database table of the first source system based on the detected fields in the electronic file when one or more of the fields in the electronic file do not exist in the database table of the first source system; and
in response to the imported file, generate new fields in a database table of a second of the source systems based on the on-line version of the electronic file.

\* \* \* \* \*